(12) United States Patent
Henzler

(10) Patent No.: US 6,585,619 B2
(45) Date of Patent: Jul. 1, 2003

(54) TRANSMISSION ARRANGEMENT

(75) Inventor: Steffen Henzler, Böbingen (DE)

(73) Assignee: Daimler Chrysler AG, Stuttgart (DE)

( * ) Notice: Subject to any disclaimer, the term of this patent is extended or adjusted under 35 U.S.C. 154(b) by 0 days.

(21) Appl. No.: 09/925,966

(22) Filed: Aug. 9, 2001

(65) Prior Publication Data

US 2002/0019285 A1 Feb. 14, 2002

(30) Foreign Application Priority Data

Aug. 11, 2000 (DE) .......................... 100 40 039

(51) Int. Cl.$^7$ .............................................. F16H 37/02
(52) U.S. Cl. ...................................................... 475/214
(58) Field of Search ................................. 475/214, 216

(56) References Cited

U.S. PATENT DOCUMENTS

| | | | |
|---|---|---|---|
| 6,059,685 A | | 5/2000 | Hoge |
| 6,099,431 A | * | 8/2000 | Hoge et al. .................. 475/216 |
| 6,251,039 B1 | * | 6/2001 | Koga ......................... 475/216 |
| 6,358,178 B1 | * | 3/2002 | Wittkopp .................... 475/207 |

* cited by examiner

Primary Examiner—Dirk Wright
(74) Attorney, Agent, or Firm—Klaus J. Bach

(57) ABSTRACT

In a transmission arrangement including a continuously variable toroidal drive mechanism, an intermediate planetary gear train and a final planetary gear train which are arranged in the power path between an input shaft and an output shaft, a central intermediate shaft is connected to the input shaft and to a central drive disc of the toroidal drive mechanism, and to a planet carrier of the intermediate gear train. A concentric intermediate shaft, through which the central intermediate shaft extends, is connected to a central driven disc of the toroidal drive mechanism and to a sun gear of the intermediate gear train. The concentric intermediate shaft has a drive connection to a first mechanism link of the final gear train in the form of a sun gear. An outer ring gear of the intermediate gear train has a drive connection to a second mechanism link of the final gear train. A third mechanism link of the final gear train is mounted on a housing part. A fourth mechanism link of the final gear train has a drive connection to the output shaft, this arrangement providing for high efficiency with a coaxial arrangement of the transmission components.

21 Claims, 5 Drawing Sheets

TRANSMISSION ARRANGEMENT

BACKGROUND OF THE INVENTION

The invention relates to a transmission arrangement, in which a continuously variable toroidal drive mechanism, an intermediate planetary gear train and a final planetary gear train are arranged in the power path between an input shaft and an output shaft.

In a known transmission arrangement of this type (U.S. Pat. No. 6,059,685) a central intermediate shaft is connected to the input shaft, to a central toroidal drive disc of the toroidal drive mechanism and to the two-armed planet carrier of the intermediate gear train supporting double planet wheels. A concentric intermediate shaft, through which the central intermediate shaft extends with radial clearance, connects a central toroidal driven disc of the toroidal drive mechanism to a sun gear of the intermediate gear train, which has a drive connection containing a clutch with a first mechanism link in the form of a sun gear of the final gear train. The two concentric intermediate shafts create two central torque paths for the passage through the toroidal drive mechanism, thereby permitting a fundamentally coaxial arrangement of input and output shafts and also of the three gear trains, were the toroidal drive mechanism to be equipped with only one toroidal drive disc and one toroidal driven disc.

In order to also achieve the parallel connection of two central toroidal drive discs and two central toroidal driven discs, otherwise common in toroidal drive mechanisms, with a fundamentally coaxial arrangement of all the said transmission components, in the known transmission arrangement the concentric intermediate shaft is also connected in parallel with the second driven disc, and the one arm of the planet carrier of the intermediate gear train carrying the secondary planet wheels is also connected in parallel to the second drive disc of the toroidal drive mechanism. Furthermore, in the known transmission arrangement, in order to be able to bring the sun gear of the intermediate gear train connected to the concentric shaft into drive connection with the sun gear forming the first mechanism link of the final gear train, the other arm of the planet carrier, carrying the main planet wheels meshing with the secondary planet wheels, is connected by a radial drive arm to the central intermediate shaft, and two inner central gears meshing with the main planet wheels are arranged on both sides of the radial drive arm, one of the sun gears being connected to the concentric intermediate shaft and the other sun gear having the drive connection, containing an engageable and disengageable clutch, to the sun gear forming the first mechanism link of the final gear train.

The secondary planet wheels of the intermediate gear train in turn mesh with an ring gear, which has a drive connection, including an engageable and disengageable clutch, to a second mechanism link in the form of a planet carrier of the final gear train carrying double planet wheels, the carrier in turn also being connected to the output shaft.

Whilst in the final gear train of the known transmission arrangement one of each of the two intermeshing single planet wheels that form a double planet wheel meshes with the sun gear provided as the first mechanism link of the final gear train, the ring gear meshing with each of the other single planet wheels is fixed so that it cannot rotate in relation to a non-rotating part of the housing, as a third mechanism link of the final gear train.

In the known transmission arrangement the clutch connecting the outer ring gear of the intermediate gear train to the planet carrier of the final gear train is engaged in the bottom low-speed range and in reverse gear, whilst the clutch connecting the second sun gear of the intermediate gear train to the sun gear of the final gear train is engaged in the adjoining upper higher-speed range.

An inherent feature of a toroidal drive system is the reversal in the direction of rotation between input and output, because it is in principle a planetary gear train with firmly braked planet carrier, in which the planet wheels, here known as "rollers", each in frictional contract with a toroidal central drive and driven disc, are mounted so that they can swivel about a swivel axis perpendicular to their axis of rotation but are otherwise immovably fixed in their position relative to the central axis. Since in the known transmission arrangement in the upper drive range the final gear train is driven directly by the output of the toroidal drive mechanism, the final gear train in this drive range must have a negative transmission ratio in forward drive, which is achieved by the double planet wheels, which at high road speeds, however, have high rotational speeds in relation to their planet carrier. In the lower drive range, too, the efficiency of the known transmission arrangement is low, because the output shaft is driven directly by the outer central gear of the intermediate gear train, thereby obviating the need for a final gear train, the latter nevertheless also giving rise to power losses in this drive range owing to its braked outer ring gear, and its sun gear thereby being geared up in relation to the output shaft.

The object of the invention is essentially to create a transmission arrangement with a high efficiency, in which a toroidal drive mechanism, an intermediate planetary gear train and a final planetary gear train are arranged in the power path between an input shaft and an output shaft with a fundamentally coaxial alignment of the transmission components.

SUMMARY OF THE INVENTION

In a transmission arrangement including a continuously variable toroidal drive mechanism, an intermediate planetary gear train and a final planetary gear train which are arranged in the power path between an input shaft and an output shaft, a central intermediate shaft is connected to the input shaft and to a central drive disc of the toroidal drive mechanism, and to a planet carrier of the intermediate gear train. A concentric intermediate shaft, through which the central intermediate shaft extends, is connected to a central driven disc of the toroidal drive mechanism and to a sun gear of the intermediate gear train. The concentric intermediate shaft has a drive connection to a first mechanism link of the final gear train in the form of a sun gear. An outer ring gear of the intermediate gear train has a drive connection to a second mechanism link of the final gear train. A third mechanism link of the final gear train is mounted on a housing part. A fourth mechanism link of the final gear train has a drive connection to the output shaft, this arrangement providing for high efficiency with a coaxial arrangement of the transmission components.

In the transmission arrangement according to the invention, the final gear train has a fourth mechanism link for driving the output shaft, it being possible to integrate the link into the transmission mechanism by way of a second toothed rim of the planet wheels or by means of an additional final planetary gear train with a common planet carrier for both final gear trains.

In the transmission arrangement according to the invention, the number of teeth situated in the power flow of the upper drive range is reduced to a minimum in order to achieve the same directions of rotation of input shaft and output shaft in forward drive and a fundamentally coaxial design for the arrangement.

In the transmission arrangement according to the invention, the rotationally fixed planet carrier achieves the function of an ordinary gear train without clutch power flows for the final gear train(s), thereby increasing the efficiency in the upper drive range affecting consumption, and thus obtaining a reduction in the fuel consumption.

In the transmission arrangement according to the invention, the use of a planet wheel with two toothed rims having an equal or unequal number of teeth in the final gear train means, on the one hand, that the rotational speeds of the planet wheel in relation to the planet carrier can be kept low and, on the other, that identical planet wheels can be provided in intermediate gear train and final gear train, which results in identical bearing pins, friction washers, bearings and sun gears and gear rings, etc.

In the transmission arrangement according to the invention, the main planet wheels in the intermediate gear train can be designed with toothed rims having different numbers of teeth. In an advantageous embodiment the toothed rim meshing with the second inner central gear, which by way of the one clutch can be brought into drive connection with the sun gear forming the first mechanism link of the final gear train, has the greater number of teeth, so that higher rotational speeds occur at the input of the final gear train than at the output of the toroidal drive mechanism. A spread of 4.5, for example, can thereby be achieved for the transmission arrangement with a spread of 5.5 for the toroidal drive mechanism in the upper drive range, that is to say the reduction in the spread is significantly less in the transmission arrangement according to the invention than in known transmission arrangements. Furthermore, a power division is achieved in the transmission arrangement because of the differing numbers of teeth. A constant power component is transmitted by way of the direct path of the central intermediate shaft 10 and a variable power component by way of the toroidal drive mechanism 7, which is subjected to reduced load and can therefore be of smaller dimensions. Since the efficiency of the direct path is greater than that of the toroidal drive mechanism, this also results in increased overall efficiency.

In the transmission arrangement according to the invention, in the embodiment having an additional final planetary gear train, transmission of the first drive range by means of the additional final gear train permits optimization of the individual transmission ratios in the transmission arrangement. A slight reduction in efficiency due to the additional tooth engagements and its effect on fuel consumption may be disregarded in view of the small length of time spent in the lower drive range as a proportion of total vehicle operating time. In particular, it is possible by means of the additional final gear train to design the transmission ratios so that the dynamic neutral condition, in which the rotational speed of the output shaft is equal to zero, lies in the area of a transmission ratio of the toroidal drive mechanism of −1 and hence in the highest load capacity range. Furthermore, the additional final gear train permits optimization of the transmission range of the upper drive range with regard to consumption.

In the transmission arrangement according to the invention, there appears to be an increase in the design cost owing to the additional gear plane, but it also provides a reduction in the overall length of the arrangement. If the output shaft is driven by an outer ring gear of the final drive train, for example, the parking position gear can be rotationally fixed to this ring gear and therefore incorporated into the arrangement with no need for additional overall axial space. Since in the transmission arrangement according to the invention the planet carrier of the final gear train is fixed to the housing, the transmission shafts can be advantageously supported, which likewise leads to a reduction in the axial length of the arrangement. Furthermore, it is possible in the transmission arrangement according to the invention to direct the oil supply to the transmission shafts by way of the fixed planet carrier, which also proves advantageous in the desired shortening of the overall length of the arrangement. Finally the roller bearing arrangement supporting the output shaft at its output flange end in relation to the housing and the outer central gear drive connected to the output shaft can be arranged in the same axial area of the axis of rotation of the output shaft, so that a compact design and a short overall length are achieved.

The invention is described in more detail below with reference to four embodiments represented more or less diagrammatically in the drawing:

DESCRIPTION OF PREFERRED EMBODIMENTS

Figure 1:
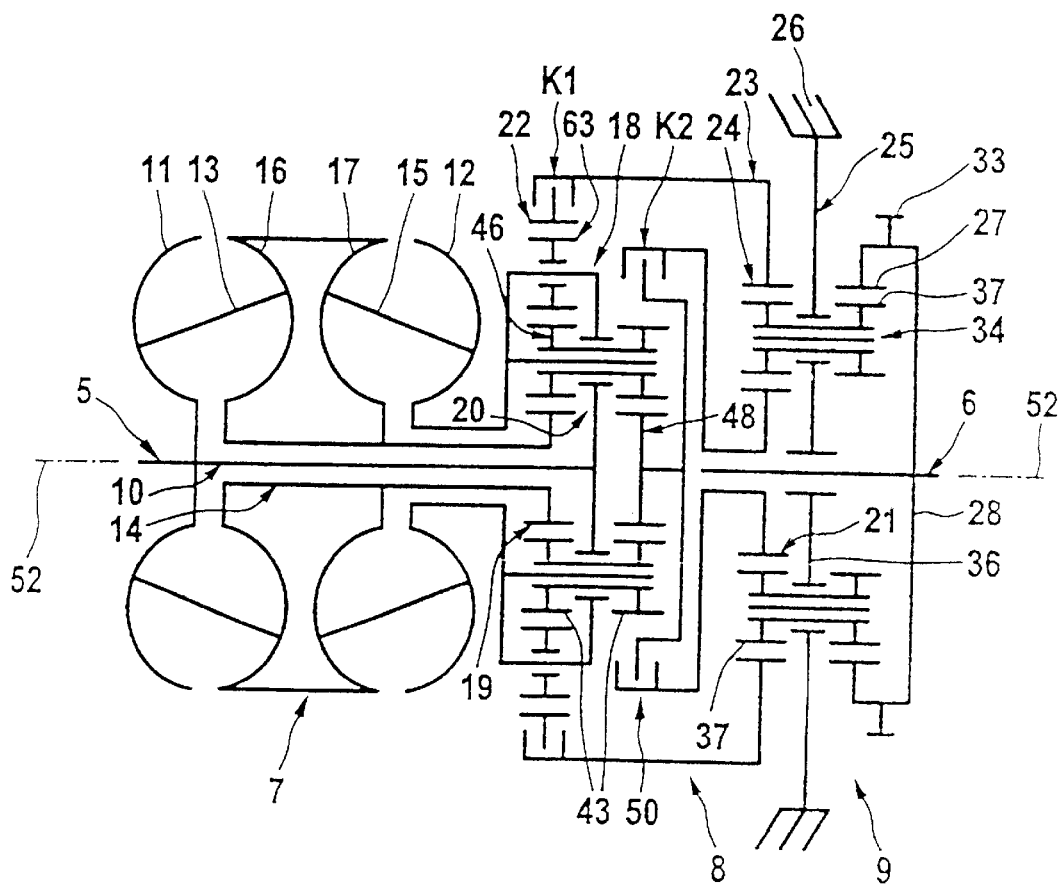
FIG. 1 shows a transmission diagram in the form of an axial section through a first embodiment of a transmission arrangement according to the invention.

Referring to the first embodiment shown in FIG. 1, a continuously variable toroidal drive mechanism 7, an intermediate planetary gear train 8 and a final planetary gear train 9 are arranged in the power path between an input shaft 5, that can be driven in the usual way by a drive motor, and an output shaft 6 that can be coupled in the usual way to the wheels of a vehicle. The input shaft 5 is firmly connected to the one adjacent, toroidal central drive disc 11 of the toroidal drive mechanism 7 and by way of a coaxial central intermediate shaft 10 to a two-arm planet carrier 18 of the intermediate gear train 8, which is in turn rotationally fixed to the adjacently arranged second central toroidal drive disc 12 of the toroidal drive mechanism 7 that is connected in parallel to the first drive disc 11 in the power path. An intermediate shaft 14, arranged coaxially with the common geometric axis of rotation 52–52 of input and output shaft 5 and 6 and with the central intermediate shaft 10 passing concentrically through the shaft 14 with clearance, is firmly connected to the two central toroidal driven discs 16 and 17 of the toroidal drive mechanism 7, arranged adjacently to one another, and to a sun gear 19 of the intermediate gear train 8. In the usual way in toroidal drive mechanisms, a drive disc 11 and 12 is in frictional contact with its associated driven disc 16 and 17 respectively by way of circular disc-shaped planet wheels, so called rollers 13 and 15, which are arranged so that they can each rotate about a separate axis of rotation and also swivel about a swivel axis perpendicular to their axis of rotation, but are otherwise positionally fixed in relation to the central axis of the toroidal drive mechanism 7 coinciding with the axis of rotation 52–52.

The sun gear 19 of the intermediate gear train 8 has a drive connection 20 to a sun gear 21 as a first mechanism link of the final gear train 9. This drive connection 20 includes main planet wheels 46 supported on the one arm of the planet carrier 18 of the intermediate gear train 8, with toothed rims 43 arranged on both sides of a radial drive arm of the planet carrier 18, of which one toothed rim 43 meshes with the sun gear 19 connected to the concentric intermediate shaft 14 and the other toothed rim 43 meshes with a second sun gear 48 arranged axially on the other side of the radial drive arm, the latter gear finally in turn having a drive connection 50—containing an engageable and disengageable clutch K2—to the sun gear 21 forming the first mechanism link of the final gear train.

The toothed rim 43 of the main planet wheel 46 meshing with the sun gear 19 of the intermediate gear train 8 is also in meshing engagement with a secondary planet wheel 63, which is supported on the second arm of the planet carrier 18 and in turn meshes with an outer ring 22, which has a drive connection 23—containing an engageable and disengageable clutch K1—to an outer ring gear 24 forming a second mechanism link of the final gear train 9.

The final gear train 9 has a third mechanism link in the form of a planet carrier 25, which is fixed by a radial support structure 36 so that it cannot rotate in relation to a non-rotating housing part 26, and supports planet wheels 34 with two toothed rims 37 having an identical number of teeth, which are arranged on both sides of the support arm 36, and one of which, the toothed rim 37 situated adjacent to the intermediate gear train 8, meshes both with the inner and with the gear ring 24, respectively.

The final gear train 9 has a fourth mechanism link in the form of a second ring gear 27, which meshes with the other toothed rim 37 of the planet wheels 34 and has a drive connection 28 to the output shaft 6.

A parking position gear 33 is arranged concentrically and immovably on the outer circumference of the outer central gear 27.

In the lower drive range the clutch K1 is engaged and the clutch K2 disengaged, so that the power is fed to the intermediate gear train 8, branched by way of the intermediate shafts 10,14 and, reunited in the said gear train, is delivered to the output shaft 6 by way of the drive connection 23 and the final gear train 9 here connected in the sub-ratio 1:1.

Figure 2:
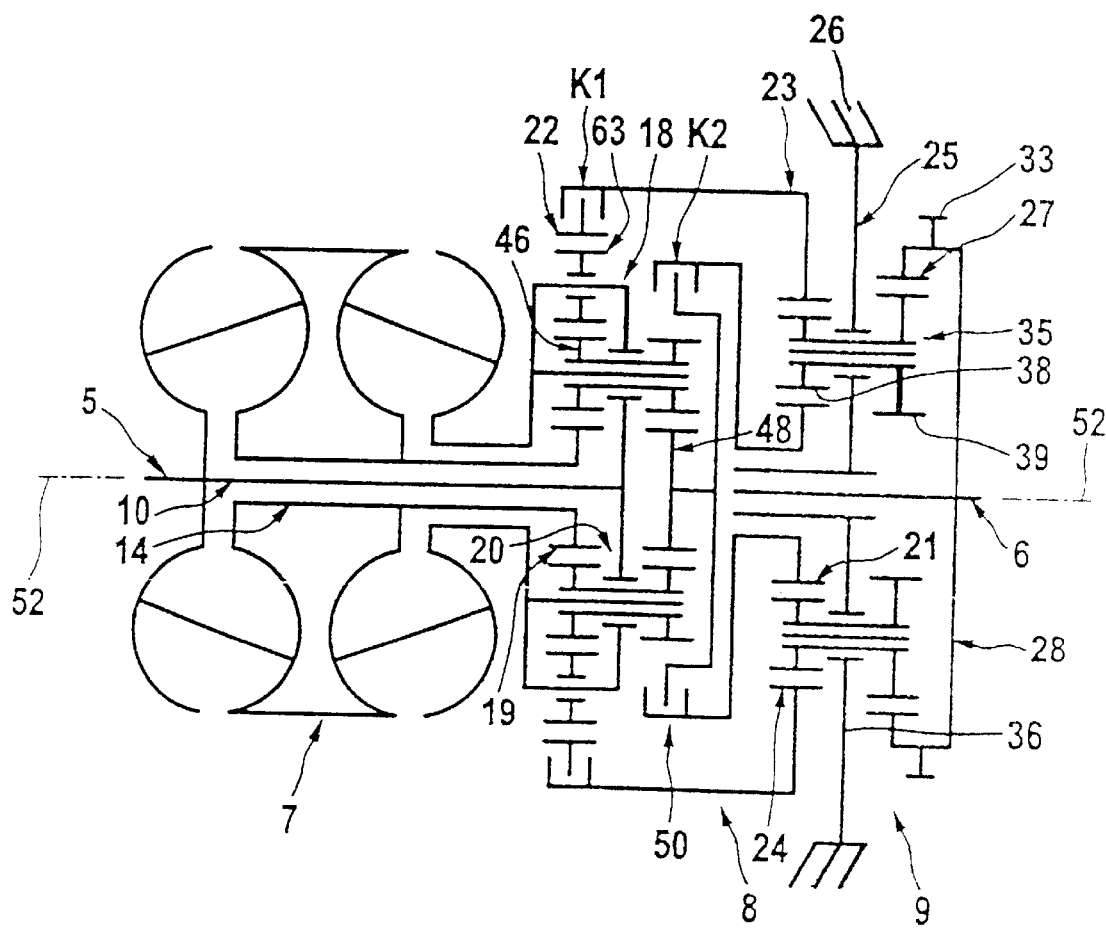
FIG. 2 shows a transmission diagram in the form of an axial section through a second embodiment of a transmission arrangement according to the invention.

The second embodiment of the transmission arrangement according to the invention as shown in FIG. 2 differs from the first embodiment in FIG. 1 only in that the planet wheels 35 of the final gear train 9 have toothed rims 38 and 39 with different numbers of teeth, the toothed rim 39 having the greater number of teeth meshing with the outer central gear 27 having the drive connection 28 to the output shaft 6. In this way the sub-ratio of the final gear train 9 is less than 1 in the lower drive range and greater than 1 in the upper drive range.

Figure 2A:
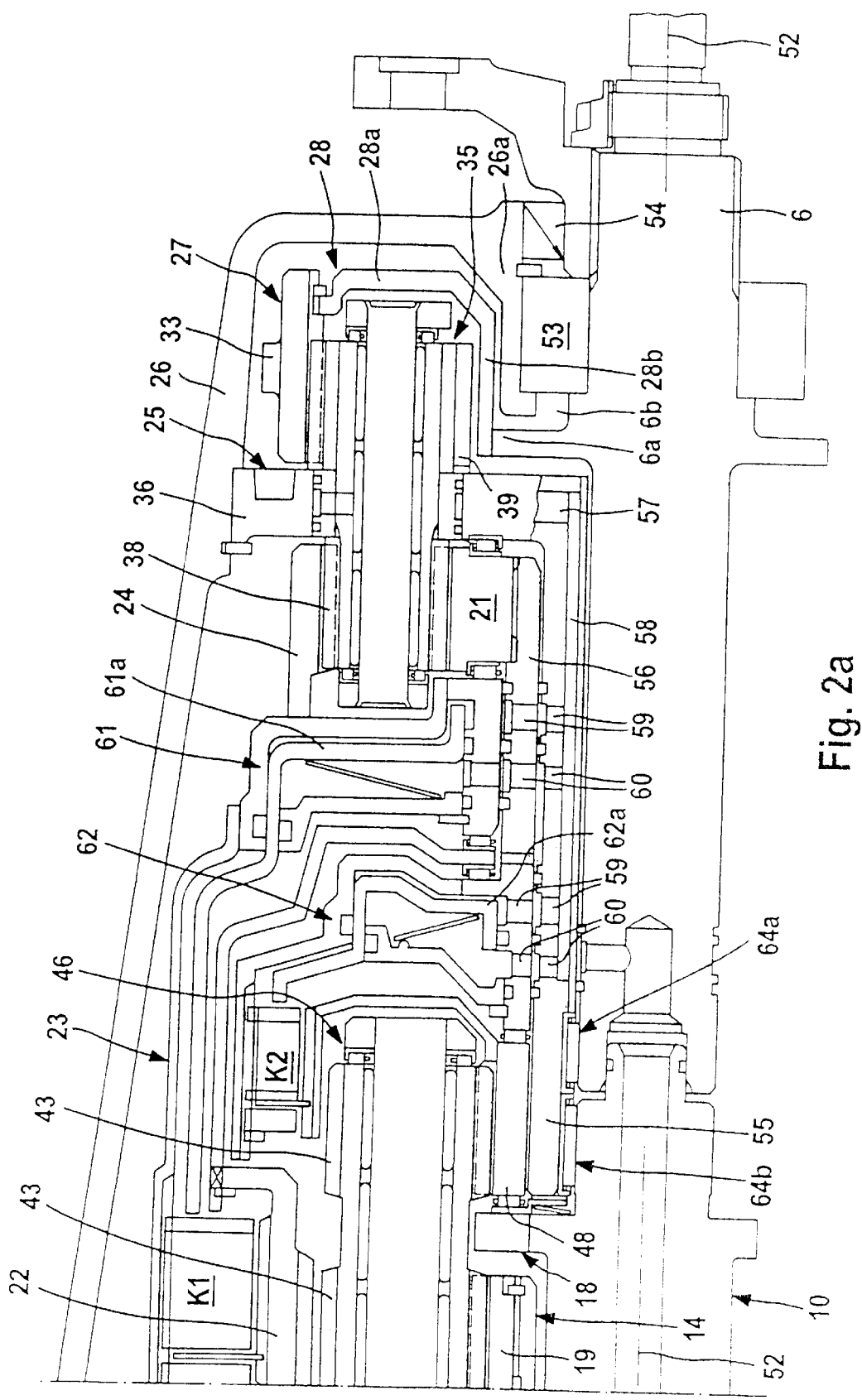
FIG. 2*a* shows a partially detailed representation of the transmission diagram in FIG. 2.

Referring to FIG. 2a it can be seen that in both embodiments the planet carrier 25 of the final gear train 9 is used both to support transmission shafts and for supplying hydraulic oil to the clutch actuators 61 and 62 operating the clutches K1 and K2. In detail, the radial support arm 36 supporting the planet wheels 35 between their toothed rims 38 and 39 is both provided with radial oil ducts 57 and, at its radially inner end, is rigidly connected to a hub sleeve 55 concentric with the central axis 52—52.

A central gear shaft 56, rotationally fixed to the sun gear 21, and a hub of the sun gear 48 among other things are rotatably mounted on the hub sleeve 55.

The adjoining shaft ends of output shaft 6 and central intermediate shaft 10 are each supported by way of a radial needle bearing 64a and 64b in the hub sleeve 55—at the opposite end to the support arm 36.

The hub sleeve 55 has an axial oil duct 58, which connects on the one hand with radial oil duct 57 of the support arm 36 and on the other with radial oil bores 59 and 60, which are formed in the hub sleeve 55 and central gear shaft 56 and which in turn connect both with one another and with the clutch actuators 61 and 62 for the application of pressure to the relevant working pistons 61a and 62a and the relief thereof.

It will also be seen from FIG. 2a that, at the opposite end to the intermediate shaft 10, that the output shaft 6 is supported by a roller bearing arrangement 53 designed as fixed bearing so that it is axially immovable and can rotate in relation to a non-rotating housing part 26a. The roller bearing arrangement 53 and the section of the housing part 26a supporting it are arranged in an annular chamber 6b, which is enclosed from the inside outwards by the output shaft 6, by a radial collar 6a of the output shaft 6 and by a cylindrical section 28b of the L-shaped drive arm 28. The drive arm 28 has a radial arm part 28a arranged behind the planet wheel 35, the arm part being rotationally fixed to the outer ring gear 27 by way of drive teeth and integrally formed with the cylindrical arm part 28b.

Finally the roller bearing arrangement 53 and hence also the annular chamber 6b are sealed off from the atmosphere by a seal arrangement 54, which is inserted concentrically between housing part 26a and output shaft 6 or an output flange of the latter.

In the remaining features and functions also—with the exception, that is, of the different toothed rims 38 and 39 and the resulting sub-ratio greater than 1 in the final gear train 9—the first and second embodiment are identical. The same reference numbers and data are used for corresponding features and reference may therefore be made to the description of FIG. 1 for a fuller description of the second embodiment.

Figure 3:
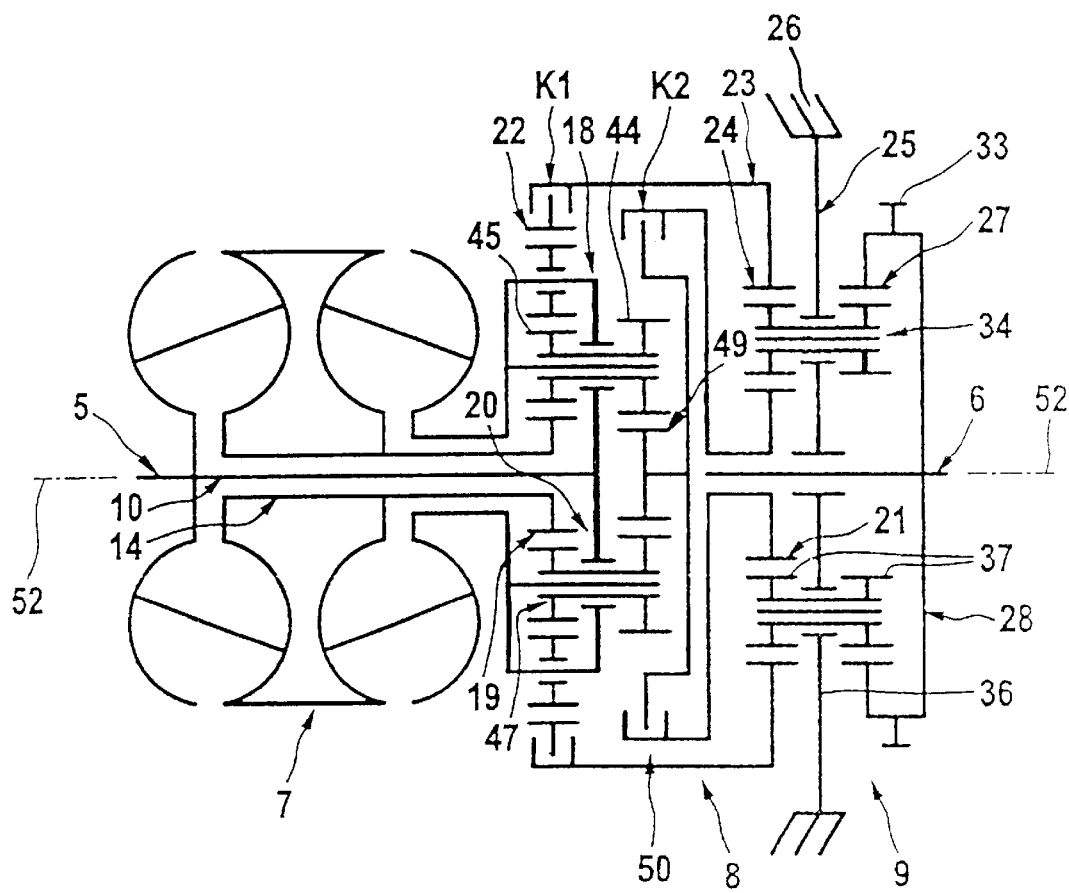
FIG. 3 shows a transmission diagram in the form of an axial section through a third embodiment of a transmission arrangement according to the invention.

The third embodiment of the transmission arrangement according to the invention as shown in FIG. 3 differs from the first embodiment shown in FIG. 1 only in that the toothed rims 44 and 45 of the main planet wheel 47 in the intermediate gear train 8 have different numbers of teeth, such that the toothed rim 44 meshing with the second sun gear 49—which has the drive connection 50 to the sun gear 21 of the final gear train 9—is provided with the greater number of teeth, resulting in an increase in the rotational speed of the second inner sun 49 in relation to the output speed of the toroidal drive mechanism 7, that is of the sun gear 19.

In the remaining features and functions the third and first embodiment are identical. The same reference numbers and data are used for corresponding features and reference may therefore be made to the description of FIG. 1 for a fuller description of the third embodiment.

Figure 4:
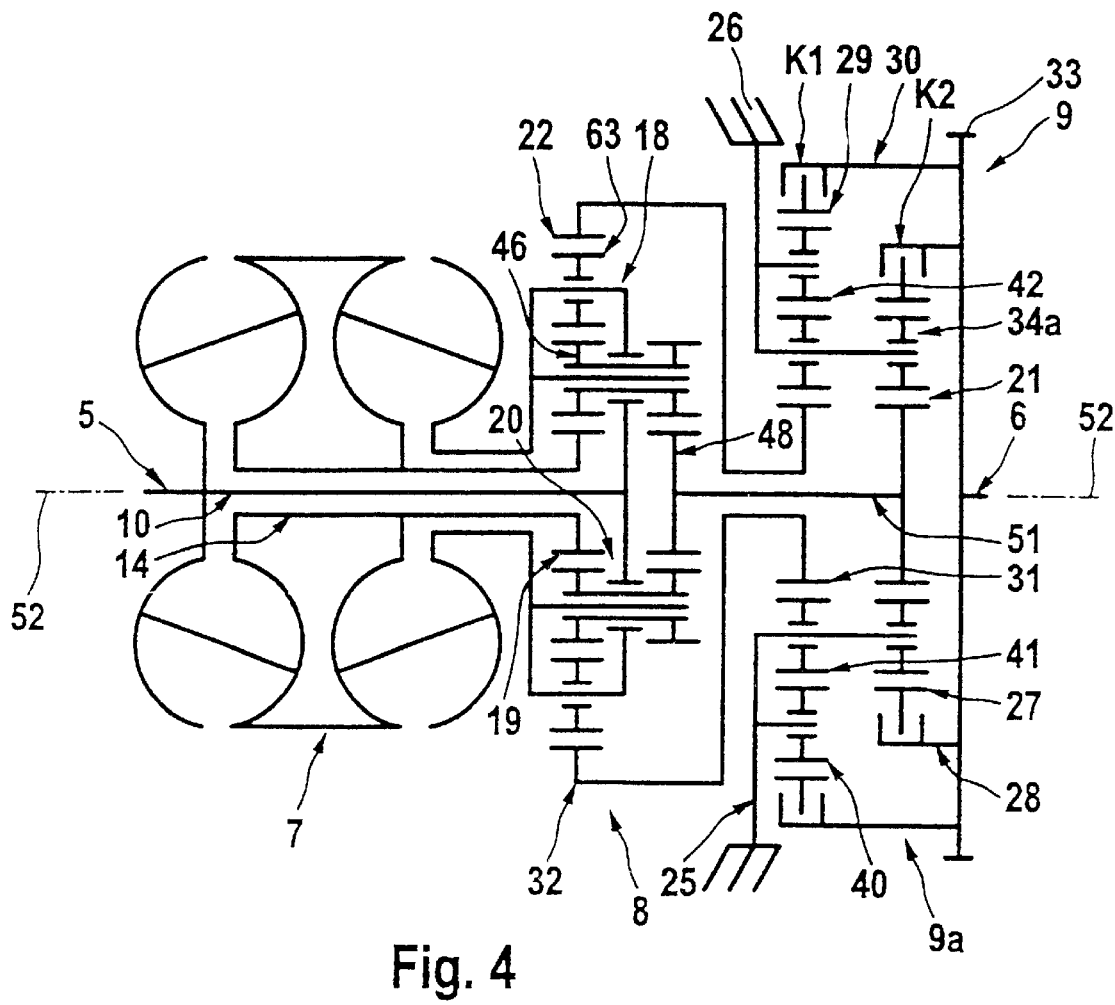
FIG. 4 shows a transmission diagram in the form of an axial section through a fourth embodiment of a transmission arrangement according to the invention.

The fourth embodiment of the transmission arrangement according to the invention as shown in FIG. 4 differs from the first embodiment in FIG. 1 in that the final gear train 9 is connected by way of the planet carrier 25 to a second, in this case two-armed final planetary gear train 9a, the planet carrier of which together with the planet carrier 25 forms a single mechanism link.

The second sun gear 48 of the intermediate gear train 8 is permanently rotationally fixed by a drive connection 51 in the form of a central intermediate shaft to the sun gear 21 of the final gear train 9, which meshes with single rim planet wheels 34a, which in turn mesh with the outer annular gear 27 having the drive connection 28 to the output shaft 6, the drive connection 28 containing an engageable and disengageable clutch K2.

The outer ring gear 22 of the intermediate gear train 8 is permanently rotationally fixed by the drive connection 32 to an sun gear 31 of the second final gear train 9a. An outer ring gear 29 of the second final gear train 9a is connected to the output shaft 6 by a drive connection 30, which contains an engageable and disengageable clutch K1.

The double planet wheels 42 of the two-armed second final gear train 9a in the usual way have two intermeshing single planet wheels 40 and 41, the outer central gear 29 meshing with the single planet wheels 40 and the inner central gear 31 with the single planet wheels 41.

In contrast to the function of the first and third embodiment, in the lower drive range a sub-ratio greater than 1 operates in the final gear train because of the presence of the second final gear train 9a.

In the remaining features and functions—with the exception, that is, of the different planet wheels 34 in the final gear train 9, and the second final gear train 9a and the sub-ratio greater than 1 in the lower drive range resulting from the latter—the first and fourth embodiments are identical. The same reference numbers and data are used for corresponding features and reference may therefore be made to the description of FIG. 1 for a fuller description of the fourth embodiment.

What is claimed is:

1. Transmission arrangement, including a continuously variable toroidal drive mechanism, an intermediate planetary gear train and a final planetary gear train arranged in a power path between an input shaft and an output shaft, comprising:
   a central intermediate shaft
      which is connected to the input shaft and to a central toroidal drive disc of the toroidal drive mechanism and to a planet carrier of the intermediate gear train,
   a concentric intermediate shaft
      through which the central intermediate shaft extends,
      which is connected to a central driven disc of the toroidal drive mechanism and to a sun gear of the intermediate gear train,
      which has a drive connection to a first mechanism link of the final gear train in the form of a second sun gear
   a first outer ring of the intermediate gear train
      which has a drive connection to a second mechanism link of the final gear train in the form of a second ring gear
   a third mechanism link of the final gear train in the form of a planet carrier
      which is fixed so that it cannot rotate in relation to a non-rotating housing part, and
   a fourth mechanism link of the final gear train in the form of a third ring gear
      which has a drive connection to the output shaft.

2. Arrangement according to claim 1, wherein said third outer ring gear which is part of the fourth mechanism link of the final gear train has a drive connection to the output shaft.

3. An arrangement according to claim 2, wherein said third outer central gear is connected to a parking position gear.

4. An arrangement according to claim 1, wherein the second outer ring gear is provided for the second mechanism link of the final gear train has a drive connection to the first outer ring gear of the intermediate gear train.

5. An arrangement according to claim 1, wherein said planet carrier of the final gear train has a radial support arm supporting at least one planet wheel and said at least one planet wheel has two toothed rims arranged axially on opposite sides of the support structure.

6. An arrangement according to claim 5, wherein said toothed rims have an equal number of teeth.

7. An arrangement according to claim 5, wherein said toothed rims have different numbers of teeth.

8. An arrangement according to claim 7, wherein the toothed rim, with which the third ring gear having the drive connection to the output shaft meshes, has the greater number of teeth.

9. Arrangement according to claim 1, wherein the drive connection between the first sun gear of the intermediate gear train and the sun gear forming the first mechanism link of the final gear train contains at least one planet wheel with two toothed rims, and a third sun gear of the intermediate gear train meshing with one of the two toothed rims, and wherein the third sun gear of the intermediate gear has a drive connection to the second sun gear forming the first mechanism link of the final gear train.

10. An arrangement according to claim 9, wherein said at least one planet wheel of the intermediate gear train and the at least one planet wheel of the final gear train having two toothed rims are identical.

11. An arrangement according to claim 9, wherein the drive connection between a third sun gear of the intermediate gear train and the second sun gear forming the first mechanism link of the final gear train contains an engageable and disengageable clutch.

12. An arrangement according to claim 1, wherein the final gear train has a fifth mechanism link in the form of a fourth outer ring gear and its planet carrier additionally has at least one double planet wheel comprising two intermeshing single planet wheels, and wherein the fourth ring gear forming the fifth mechanism link meshes with the one single planet wheel and the inner central gear having the drive connection to the outer central gear of the intermediate gear train and forming the second mechanism link of the final gear train meshes with the other single planet wheel.

13. Arrangement according to claim 12, wherein the fourth ring gear forming the fifth mechanism link has a drive connection to the output shaft.

14. An arrangement according to claim 13, wherein the drive connection between the fourth outer ring gear forming the fifth mechanism link and the output shaft contains an engageable and disengageable clutch.

15. An arrangement according to claim 12, wherein the drive connection between the outer central gear forming the fourth mechanism link of the final gear train and the output shaft contains an engageable and disengageable clutch.

16. An arrangement according to claim 12, wherein the drive connection between the fourth outer ring gear of the intermediate gear train (8) and the fourth sun gear forming the second mechanism link of the final gear train, and the drive connection between the third gear of the intermediate gear train and the second sun gear forming the first mechanism link of the final gear traineach make a permanent rotationally rigid connection between their connected mechanism links.

17. Transmission arrangement, in which a continuously variable toroidal drive mechanism an intermediate planetary gear train and a final planetary gear train are arranged in a power path between an input shaft and an output shaft, comprising:

a central intermediate shaft
        which is connected to the input shaft and to a central toroidal drive disk of the toroidal drive mechanism and to a planet carrier of the intermediate gear train a concentric intermediate shaft
        through which the central intermediate shaft extends which is connected to a central driven disk of the toroidal drive mechanism a first sun gear of the intermediate gear train
    which is connected to the concentric intermediate shaft a second sun gear of the intermediate gear train
        which has a drive connection to a first mechanism link of the final planetary gear train a second mechanism link in the form of a web rotatably receiving said output shaft and supporting the planetary gears of said final gear train which, with the web stationary, reverses the direction of rotation between the first mechanism link and a third mechanism link of the final gear train a first outer ring gear of the intermediate gear train
        which has a drive connection to the third mechanism link of the final gear train a drive connection between the output shaft and one of the mechanism links of the final gear train that can be made to rotate in the opposite direction a planet wheel of the intermediate gear train
        which has a toothed rim with a predetermined number of teeth
            which meshes with the second sun gear of the intermediate gear train which has fewer than said predetermined number of teeth and a drive connection to the first mechanism link of the final gear train, and which also has a toothed rim with a smaller number of teeth than said planet wheel of the intermediate gear train and which meshes with the sun gear of the intermediate gear train having a larger number of teeth than said toothed rim of the planet wheel of said intermediate gear train which sun gear is connected to the concentric intermediate shaft.

18. An arrangement according to claim 17, wherein the second mechanism link includes a planet carrier of the final gear train which is provided for the support of at least on of the transmission shafts consisting of an output shaft, central gear shafts, central intermediate shaft.

19. An arrangement according to claim 18, wherein the planet carrier of the final gear train has hydraulic ducts for supplying operating pressure to the clutch actuators for operating the clutches and for supplying lubricating oil to lubrication points.

20. An arrangement according to claim 2, wherein the drive connection between the third outer ring gear and the output shaft has an L-shaped drive arm with a radial arm part rotationally fixed to one of the mechanism hubs including a first ring gear, and a connecting cylindrical arm part, where the cylindrical arm part is immovably connected to a radial collar of the output shaft, that the collar is offset in relation to the radial arm part in the direction of the axis of rotation of the output shaft pointing towards the toroidal drive mechanism, and that in the annular chamber enclosed by the cylindrical arm part and by the collar and by the output shaft, there is a bearing arrangement is arranged, which supports the output shaft so that it can rotate in relation to a non-rotating housing part.

21. Arrangement according to claim 20, wherein the cylindrical arm part and the third outer ring gear are arranged in the same axial area of the axis of rotation of the output shaft.

\* \* \* \* \*